Patented Mar. 21, 1939

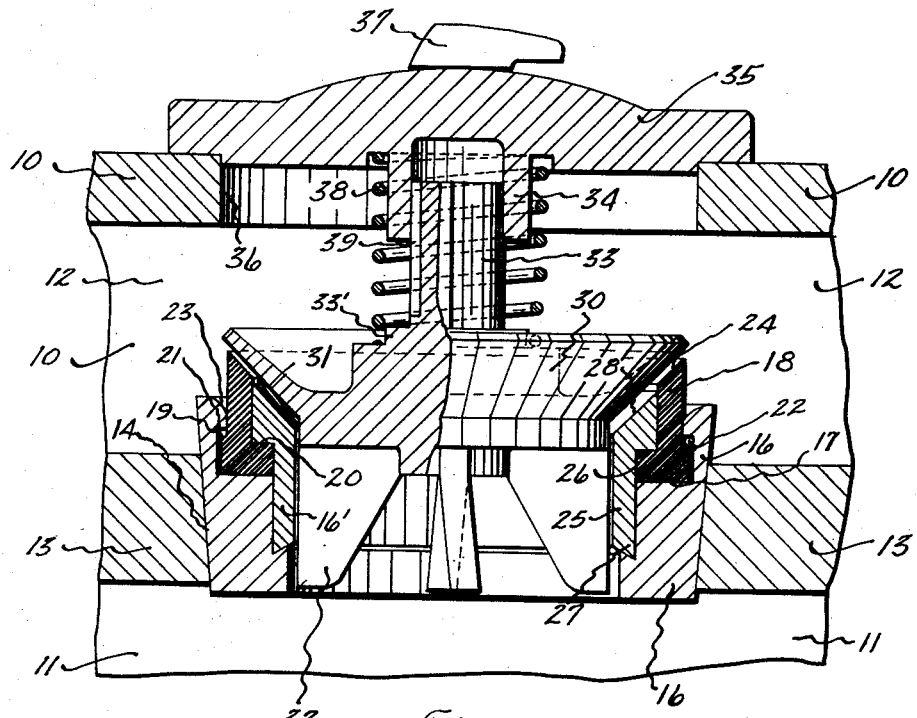
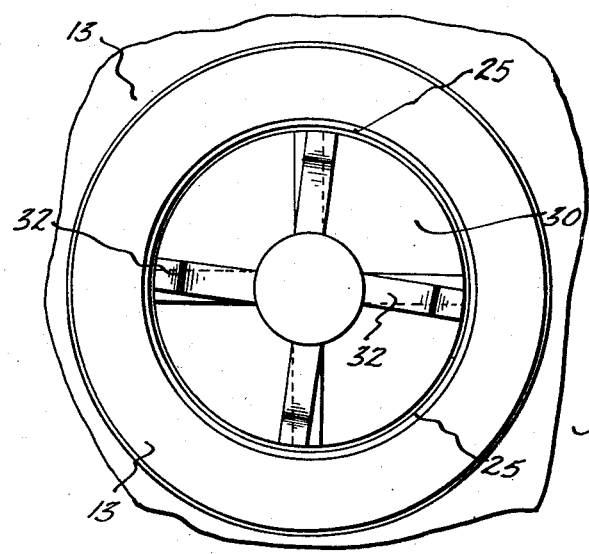
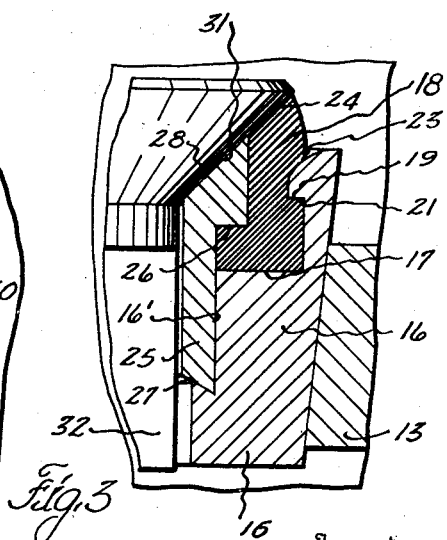

2,151,442

UNITED STATES PATENT OFFICE 2,151,442

VALVE

Hardy Roberts, Austin, and Charles H. Robertson, Fort Worth, Tex.

Application February 1, 1937, Serial No. 123,408

16 Claims. (Cl. 251—144)

This invention relates to new and useful improvements in valves.

One object of the invention is to provide an improved valve which is particularly adapted for use with the usual slush pump, although it may be employed for other purposes.

An important object of the invention is to provide a valve having an improved valve seat which is arranged to form a double seal when the valve head is seated, whereby any leakage past the seat is prevented.

Another object of the invention is to provide an improved valve seat having means for cushioning or absorbing the shock occasioned by the seating of the valve disk whereby pounding of the disk against the seat, resulting in battering or undue wear thereon, is obviated and the life of the valve seat increased.

A further object of the invention is to provide an improved valve seat including a body having a resilient ring and a metallic ring mounted therein, said rings forming a seat on which the valve disk seats; the resilient ring being mounted so that it may undergo deformation or distortion under pressure without damage thereto and being so arranged that an even contact of the resilient ring with the surface of the disk is assured, said resilient ring not only acting as a seal but also providing a cushion which prevents undue pounding, battering or wear of the metallic ring.

Still another object of the invention is to provide an improved valve seat wherein a seating ring insert is mounted in the body whereby replacement of the seating surface may be accomplished without removing the entire body; the insert being so mounted within said body that inward displacement of said insert, due to the pressure of the valve disk seating thereon, is impossible.

A construction designed to carry out the invention will be hereinafter described, together with other features of the invention.

The invention will be more readily understood from a reading of the following specification and by reference to the accompanying drawing, in which an example of the invention is shown, and wherein:

Figure 1 is a view, partly in elevation and partly in section of a valve, constructed in accordance with the invention, Figure 2 is a bottom view of the valve, and Figure 3 is an enlarged sectional detail, showing the valve head in its seated position.

In the drawing, the numeral 10 designates a portion of a pump which has the usual intake chamber 11 and discharge chamber 12. The chambers are separated by the usual partition or deck 13 which is provided with a circular opening 14 therethrough. The wall of the opening 14 is inclined or tapered outwardly from its lower end toward its upper end.

An annular valve seat body 16 having its outer wall tapered complementary to the taper of the opening 14 is inserted within said opening. The body has a snug fit within the opening and is driven or wedged therein, whereby it is securely held in position. The body is shown as having a height greater than the deck so that when it is mounted therein, its upper and lower ends project above and below the same. However, this projection of the body is not essential for it could have its upper and lower ends flush with the upper and lower surfaces of the deck.

The body is formed with an internal annular shoulder 17 which, when said body is in position within the opening is slightly below the top of the deck or partition 13 in a horizontal plane. This shoulder is comparatively wide and an annular elastic ring 18 is seated thereon. The base of the ring is substantially the same width as the shoulder while the upper end of said ring is reduced, whereby an external annular shoulder 19 and an internal annular shoulder 20 are formed on said ring. The external shoulder is narrower in width than the shoulder 20 and is located above the latter in a horizontal plane. An annular inwardly directed lip or flange 21 is provided at the upper end of the body 16 and this lip overhangs the external shoulder on the ring, whereby upward displacement of the ring is prevented. It is noted that normally a small annular flow space 22 is provided between the overhanging lip and external shoulder so that the ring may be deformed or distorted into this space, as will be explained. If desired, further flow space may be provided between the outer wall of the ring and the body. The inner upper edge of the body adjacent the ring 18 is chambered or beveled at 23 in order to prevent the ring contacting any sharp corners or edges.

The reduced upper end of the elastic ring extends above the upper end of the body and the top of said ring is beveled or inclined as shown at 24. The ring is preferably constructed of rubber, rubber compound, or other similar material but it may be made of any elastic or resilient material suitable for the purpose.

A metallic ring or gland 25 is inserted within the elastic ring 18, and is formed with an external annular shoulder 26 which engages the internal shoulder 20 of said ring 18. The lower portion of the gland fits snugly within the bore 16' of the body 16, while the extreme lower end thereof is beveled to engage a complementary recess 27 formed in lower end of the bore of said body, whereby the gland is securely supported within the body. When the lower end of said gland is engaged within the recess, the shoulder 26 is resting on the shoulder 20 of the ring 18 and said ring is in its normal or unexpanded position, as shown in Figure 1. The upper surface or top of the metallic gland or ring is inclined or beveled at 28 and this incline is at substantially the same angle as the bevel or incline 24 of the upper end of the elastic ring 18. With the ring 18 in its normal undistorted position, the upper end of the gland terminates slightly below the upper end of said ring, this upper end however, being preferably above the top of the body 16 in a horizontal plane (Figure 1). Thus, it will be seen that the metallic gland 25 and elastic ring 18 provide a valve seat. Both of these members are readily removable from the body 16 and if they become worn or for any other reason require replacement, they may be easily removed and replaced. This eliminates the necessity of removing the entire body 16 and greatly simplifies replacement as well as reducing the likelihood of damaging the body through constant removal and replacement.

A valve disk 30 is provided with a beveled or inclined seating surface 31 complementary to the beveled upper ends 24 and 28 of the ring 18 and gland 25. The seating surface is substantially equal to the combined surface of the beveled upper ends of the ring and gland, whereby the disk seats on both members when in its seated position (Figure 3). Integral radial wings or guide blades 32 depend from the bottom of the disk into the gland and bore of the body 16. These wings or blades are twisted or slightly turned from one vertical edge to the other, so that when fluid strikes the same, a rotation is imparted to the valve disk, which causes the seating surface 31 of said disk to be changed with relation to the seat formed by the ring 18 and gland 25. Therefore, the disk will never seat in exactly the same position twice in succession.

The disk 30 is provided with an axial stem 33 which extends upwardly therefrom. The upper end of the stem is movable within a guide collar 34 which depends from a cover 35. The cover closes an opening 36 in the top of the discharge chamber, which opening is in alinement with the opening 14 in the deck or partition 13. The cover is shown clamped in place by the usual yoke 37, but may be fastened on the pump in any desired manner.

For normally holding the valve on its seat, a coil spring 38 surrounds the stem 33 and is confined between the cover 35 and a shoulder 33' provided on the valve disk at the base of the stem. It has been found that if desired, the spring may be eliminated. In the event that fluid should be trapped within the guide collar 34 above the stem, such fluid may escape through vertical grooves 39 formed in the outer surface of the stem.

When the pump is in operation, it will be seen that upon the suction stroke of said pump, the fluid will be drawn into the intake chamber 11. At such time the valve disk is seated, being held so by the coiled spring 38 and suction of the pump. Upon the discharge stroke of the pump, the disk is lifted against tension of the spring 38 and the fluid will flow past the seat into the discharge chamber 12. At the completion of the discharge stroke, the disk will again of course move downwardly to its seated position.

Just prior to the disk seating, the parts will be in the position shown in Figure 1, with the elastic ring 18 in its normal position. Since the upper end of this ring is normally above the upper end of the metallic ring or gland, it will be manifest that the seating surface 31 of the disk will first contact said ring 18. As it does so pressure is applied to said ring and the same is deformed, the outer surface of the upper end of the ring being forced outwardly over the bevel 23 on the body 16. The application of pressure by the disk also forces the upper beveled end downwardly, whereby the lower portion of body of the ring is deformed or distorted into the flow space 22 provided between the ring and body 16.

It is noted that the provision of the flow space assures an even contact of the beveled upper end of the ring with the surface of the disk. If such space were not provided, the tendency of the ring 18, upon initial application of pressure thereagainst, would be to move outwardly at its upper end, resulting in an uneven contact between its beveled upper end and the disk.

The ring 18 is deformed until its upper end is in alinement with upper end of the metallic gland 25, at which time the seating surface 31 of the disk also engages said gland. After such engagement the load is carried by the metallic gland, the elastic ring 18 merely acting to provide a seal at its point of contact with the surface. Because the elastic ring is deformed, its inherent elasticity is tending to return it to its normal position and thus a most effective seal is maintained by said ring.

The disk is, of course, engaging the metallic gland 25 whereby a metal to metal seal is also had. As has been stated, the load is carried by this gland which is immovable due to its mounting in the bore of the body 16. It is noted that since the lower end of the gland is engaging the recess 27 in the bore of the body any inward lateral displacement of the gland is obviated. It has been found in actual practice that a pressure on the upper end of the gland tends to bow the side walls of said gland which results in an inward displacement of the lower end of the gland and it is such displacement which is eliminated by the structure shown.

From the above, it will be seen that the disk in seating, first contacts the elastic ring 18 and deforms the same before contacting the metallic gland 25. Therefore, the ring acts as a cushion for absorbing the shock and thereby eliminates battering or pounding on the gland, which greatly increases the life thereof. The flow space 22 provides a place for the elastic material of the ring 18 to flow when deformed and also assures a proper contact between the ring and disk. The provision of the chambered edge or bevel 23 eliminates sharp edges or corners which might be contacted by the elastic ring and between which it might be pinched and thus damaged. The elastic ring 18 assumes the position shown in Figure 3 when the valve disk is seated and by observing this figure, it will be seen that the ring flows into the bevel 23 and since no sharp corners or edges are exposed, there is no possibility of pinching the ring.

The metallic gland 25 is readily removable from the body 16, as is the elastic ring 18. Therefore, when either of these parts become worn, or must be replaced for any purpose, such replacement may be readily accomplished without removing the body 16. This is advantageous as obviously, the constant removal and replacement of the body would result in damage thereto. Although the valve is shown as applied to a pump, it may be employed for other purposes. Also the particular valve disk is subject to variation in structure for so long as its seating surface is sufficiently wide to engage both the ring and gland, the purposes of the invention are accomplished.

What we claim and desire to secure by Letters Patent is:

1. A valve including, an annular valve seat body, an elastic ring having a base confined within the body and having its upper end extending from the body, there being a flow space between the base of the ring and confining wall of said body to permit the ring to undergo deformation, a metallic gland within the ring and having its upper end normally disposed below the upper end of the ring, and a valve disk adapted to seat on the ring and gland.

2. A valve including, an annular valve seat body, an elastic ring having a base confined within the body and having its upper end extending from the body, there being a flow space between the base of the ring and confining wall of said body to permit the ring to undergo deformation, a metallic gland having its upper end within the ring and its lower end within the body, the extreme upper end of said gland being below the upper end of the ring, and a valve disk adapted to seat on the ring and gland.

3. A valve including, an annular valve seat body, an elastic ring within the body having its upper end beveled and extending above the upper end of the body, there being an outward flow space between the ring and confining wall of the body to permit said ring to undergo deformation, a metallic gland within the ring and having its upper end beveled at substantially the same angle as the bevel of the ring, said upper bevelled end of the gland being normally below the upper end of the ring, and a valve disk having an amplified seating surface for successively engaging the bevels of the ring and gland.

4. A valve including, an annular valve seat body, an elastic ring mounted within the body and having its upper end extending from the body, there being a flow space between the ring and confining wall of said body to permit the ring to undergo deformation, the extreme upper end of the body adjacent the outer surface of the ring having an annular bevel to provide further flow space when the ring is deformed and also to prevent pinching of said ring, a metallic gland within the ring and having its upper end normally disposed below the upper end of the ring, and a valve disk adapted to seat on the ring and gland.

5. A valve including, an annular valve seat body, an elastic ring having its upper end beveled and extending above the upper end of the body, there being a flow space between the ring and confining wall of the body to permit said ring to undergo deformation, the extreme upper end of the body adjacent the outer surface of the ring having an annular bevel to provide further flow space when the ring is deformed and also to prevent pinching of said ring, a metallic gland within the ring and having its upper end beveled at substantially the same angle as the bevel of the ring, said upper end of the gland being normally slightly below the upper end of the ring, and a valve disk having an amplified seating surface for engaging the bevels of the ring and gland.

6. A valve including, an annular valve seat body, an elastic ring within the body having its upper end beveled and extending above the upper end of the body, there being an outward flow space between the ring and confining wall of the body to permit said ring to undergo deformation, a metallic gland having its lower end within the bore of the body and its upper bevelled end within the ring, the extreme upper end of the gland being beveled at substantially the same angle as the ring and being disposed below the beveled upper end of said ring, and a valve disk having an amplified seating surface for successively engaging the bevels of the ring and gland.

7. A valve including, an annular valve seat body, an elastic ring mounted within the body and having its upper end extending from the body, there being a flow space between the ring and confining wall of said body to permit the ring to undergo deformation, the extreme upper end of the body adjacent the outer surface of the ring having an annular bevel to provide further flow space when the ring is deformed and also to prevent pinching of said ring, a metallic gland having its upper end within the elastic ring and its lower end secured within the bore of the body whereby inward displacement of said lower end is positively prevented, the extreme upper end of the gland being normally below the upper end of the ring, and a valve disk adapted to seat on the ring and gland.

8. A valve including, an annular valve seat body, an elastic ring having its upper end beveled and extending above the upper end of the body, there being a flow space between the ring and confining wall of the body to permit said ring to undergo deformation, the extreme upper end of the body adjacent the outer surface of the ring having an annular bevel to provide further flow space when the ring is deformed and also to prevent pinching of said ring, a metallic gland having its upper end within the elastic ring and its lower end secured within the bore of the body whereby inward displacement of said lower end is positively prevented, the extreme upper end of the gland being normally below the upper end of the ring, and a valve disk adapted to seat on the ring and gland.

9. A valve including, an annular valve seat body, having its outer surface tapered outwardly toward its upper end so as to be supported in an opening having tapered walls, an elastic ring mounted within the body and having its upper end extending from the body, there being a flow space between the base of ring and the confining wall of said body to permit the ring to undergo deformation within the body, a metallic gland within the ring and having its upper end normally disposed below the upper end of the ring, and a valve disk adapted to seat on the ring and gland.

10. A valve including, an annular valve seat body, having its outer surface tapered outwardly toward its upper end so as to be supported in an opening having tapered walls, an elastic ring having its upper end beveled and extending above the upper end of the body, there being a flow space between the base of ring and the confining wall of the body to permit said ring to undergo deformation within the body, a metallic gland within the ring and having its upper end beveled at substantially the same angle as the bevel of the ring, said upper end of the gland being normally slightly below the upper end of the ring, and a valve disk having an amplified seating surface for engaging the bevels of the ring and gland.

11. A valve including, an annular valve seat body having an internal annular shoulder below its upper end, an elastic ring supported on said shoulder and having its upper end extending from the upper end of the body, an external annular shoulder on said ring below its upper end, an annular inwardly extending lip on the upper end of the body overhanging the external shoulder on said ring, there being a flow space between the outer surface of the ring and the confining wall of the body below said overhanging lip to permit said ring to undergo deformation, an internal annular shoulder on the ring, a metallic gland overhanging said shoulder and having its lower end depending into the bore of the body, the upper end of said gland being normally below the upper end of the ring, and a valve disk having an amplified seating surface for engaging both the ring and the gland.

12. A valve including, an annular valve seat body having an internal annular shoulder below its upper end, an elastic ring supported on said shoulder and having its upper end extending a substantial distance from the upper end of the body, an external annular shoulder on said ring below its upper end, an annular inwardly extending lip on the upper end of the body overhanging the external shoulder on said ring, there being a flow space between the outer surface of the ring and the confining wall of the body below said overhanging lip to permit said ring to undergo deformation, an internal annular shoulder on the ring, a metallic gland overhanging said shoulder and having its lower end depending into the bore of the body, the upper end of said gland being normally below the upper end of the ring, means for securing the lower end of the gland within the bore of the body to prevent inward displacement of said lower end, and a valve disk having an amplified seating surface for engaging both the ring and the gland.

13. A valve including, an annular body having an internal recess and a shoulder extending from the upper end of said recess, an annular lip on the body overhanging the shoulder, an elastic ring having a base resting upon the shoulder of the body and an annular projection engaging under the lip, said ring having an upright annular portion extending a substantial distance above the body and beveled inwardly at its upper end, a metallic gland fitting tightly in the recess of the body and overhanging the elastic ring, the upper end of the gland extending a substantial distance above the top of the body to support the inner wall of the upright annular portion of the elastic ring above the top of the body and which is exposed to fluid pressure on its outer surface, the elastic ring having its upper end beveled and extending slightly above the bevel of the gland, and a valve disk adapted to seat first on the ring and then on the gland.

14. A valve including, an annular body having an internal recess and a shoulder extending from the upper end of said recess, an annular lip on the body overhanging the shoulder, an elastic ring having a base resting upon the shoulder of the body and an annular projection engaging under the lip, said ring having an upright annular portion extending a substantial distance above the body and beveled inwardly at its upper end, a metallic gland fitting tightly in the recess of the body and resting on the bottom thereof, said gland having a portion overhanging the elastic ring, the upper end of the gland extending a substantial distance above the top of the body to support the inner wall of the upright annular portion of the elastic ring above the top of the body and which is exposed to fluid pressure on its outer surface, the elastic ring having its upper end beveled and extending slightly above the bevel of the gland, and a valve disk adapted to seat first on the ring and then on the gland.

15. A valve including, an annular body having an internal recess and an internal shoulder above said recess, an elastic ring mounted in the body on said shoulder and having an upright annular portion extending above the body, the upper end of the upright portion of said ring being beveled inwardly and the upper and lower ends of said bevel being above the top of the body, a metallic gland having a reduced annular portion immovably fastened in the recess of the body and confining the elastic ring on the shoulder thereof, the upper end of the gland extending above the body and terminating short of the bevel of said ring, but supporting that portion of the ring which extends above the body, the top of the gland being beveled to conform to the bevel of the ring, and a valve disk adapted to seat first on said ring and then on the gland, the gland and valve supporting a large portion of the elastic ring which is exposed to the fluid pressure above the top of the body.

16. A valve including, an annular body having an internal recess and an internal shoulder above said recess, an elastic ring mounted in the body on said shoulder and having an upright annular portion extending above the body, the upper end of the upright portion of said ring being beveled inwardly and the upper and lower ends of said bevel being above the top of the body, a metallic gland having a reduced annular portion immovably fastened in the recess of the body and confining the elastic ring on the shoulder thereof, the upper end of the gland extending above the body and terminating short of the bevel of said ring, but supporting that portion of the ring which extends above the body, the top of the gland being beveled to conform to the bevel of the ring, and a valve disk adapted to seat first on said ring and then on the gland, the gland and valve supporting a large portion of the elastic ring which is exposed to the fluid pressure above the top of the body, the top of said body being curved outwardly to provide an amplified seat for said elastic ring.

HARDY ROBERTS.
CHARLES H. ROBERTSON.